US009148013B1

United States Patent
Yang et al.

(10) Patent No.: US 9,148,013 B1
(45) Date of Patent: Sep. 29, 2015

(54) CONTROL METHODS FOR OVER VOLTAGE PROTECTION AND RELEVANT POWER CONTROLLERS

(71) Applicant: Grenergy Opto Inc., Hsin-Chu (TW)

(72) Inventors: Chen-Lun Yang, Hsin-Chu (TW); Ren-Yi Chen, Hsin-Chu (TW); Shun-Chin Chou, Hsin-Chu (TW)

(73) Assignee: GRENERGY OPTO INC., Hsin-Chu (TW)

( * ) Notice: Subject to any disclaimer, the term of this patent is extended or adjusted under 35 U.S.C. 154(b) by 98 days.

(21) Appl. No.: 14/203,757

(22) Filed: Mar. 11, 2014

(51) Int. Cl.
*H02H 3/20* (2006.01)
*H02H 9/04* (2006.01)
*H02H 7/00* (2006.01)
*H02H 9/00* (2006.01)
*H02H 7/125* (2006.01)
*H02M 7/06* (2006.01)
*H02M 1/32* (2007.01)
*H05B 33/08* (2006.01)

(52) U.S. Cl.
CPC .............. *H02H 7/125* (2013.01); *H02M 1/32* (2013.01); *H02M 7/06* (2013.01); *H05B 33/0887* (2013.01)

(58) Field of Classification Search
CPC ......... H02H 7/10; H02H 7/1252; H02M 1/32; H05B 33/0803–33/0815; H05B 33/0884–33/089
USPC ........................................ 361/18, 91.1–91.3
See application file for complete search history.

(56) References Cited

U.S. PATENT DOCUMENTS

| | | | | |
|---|---|---|---|---|
| 6,304,066 | B1 * | 10/2001 | Wilcox et al. | 323/282 |
| 6,804,091 | B2 * | 10/2004 | Jenkins et al. | 361/18 |
| 7,542,257 | B2 * | 6/2009 | McCormick et al. | 361/91.1 |
| 8,253,350 | B2 * | 8/2012 | Hung et al. | 315/294 |
| 2006/0164770 | A1 * | 7/2006 | Inaba | 361/91.1 |
| 2011/0169423 | A1 * | 7/2011 | Huang et al. | 315/297 |
| 2011/0317322 | A1 * | 12/2011 | Chien et al. | 361/90 |
| 2012/0281326 | A1 * | 11/2012 | Grulich | 361/91.2 |
| 2014/0159608 | A1 * | 6/2014 | Simi et al. | 315/205 |
| 2015/0077004 | A1 * | 3/2015 | Jiang et al. | 315/201 |

* cited by examiner

*Primary Examiner* — Stephen W Jackson
*Assistant Examiner* — Christopher Clark
(74) *Attorney, Agent, or Firm* — McClure, Qualey & Rodack, LLP

(57) ABSTRACT

Disclosure includes a control method for over voltage protection, suitable for a power converter. The power converter has a rectifier for rectifying an alternative-current voltage into a direct-current input voltage. The direct-current input voltage is sensed and determined whether it locates in a valley. A detection voltage is provided, capable of representing the direct-current input voltage. The detection voltage is compared with a predetermined reference voltage. When the detection voltage exceeds the predetermined reference voltage and the direct-current input voltage is in the valley, an OVP signal is provided to stop the power conversion of the power converter.

12 Claims, 3 Drawing Sheets

CONTROL METHODS FOR OVER VOLTAGE PROTECTION AND RELEVANT POWER CONTROLLERS

BACKGROUND

The present disclosure relates generally to over voltage protection for power converters.

Power converters, which usually supply power to appliances used in daily life, need to be equipped with protection mechanism to prevent abnormal satiations from damaging users or surroundings. For example, a power converter that powers light emitting diodes for lighting must have overvoltage protection (OVP) so as to avoid over voltage occurring in its outputs, which might cause electric shock to human beings if touched.

FIG. 1 demonstrates a conventional power converter 10. Bridge rectifier 12 provides full-wave rectification to alternative-current (AC) mains voltage $V_{AC}$ to generate rectified direct-current (DC) input voltage $V_{IN}$ and a ground line. Power converter 10 is a buck converter having LED module 14 as a load, which connects in series with a primary winding PRM in a transformer, between DC input voltage $V_{IN}$ and the ground line. Power controller 17 has a power switch 18, which, when turned on (as being in a conduction state), energizes primary winding PRM and conducts a driving current to illuminate LED module 14. When power switch 18 is turned off (as being in a non-conduction state), primary winding PRM starts to release its stored energy to generate another driving current, which passes wheel diode 16 to keep LED module 14 illuminating. Current-sense resistor 20 provides to power controller 17 current-sense signal $V_{CS}$, a representative of the current passing through power switch 18.

If a LED open event happens to LED module 14, meaning that at least one LED in LED module 14 is open or cannot conduct current, driving voltage $V_{LED}$ could rocket if there is no corresponding protection mechanism, or OVP, built in power controller 17. The two end terminals of LED module 14, which meanwhile has a drop voltage the same with the rocket-high driving voltage $V_{LED}$, could cause severe electric shock to anyone whoever touches them, endangering human beings.

Power controller 17 in FIG. 1 detects driving voltage $V_{LED}$, through the help from the combination of node VOP, voltage divider 22 and secondary winding SEC. When the transformer de-energizes to release its stored energy, the voltage across primary winding PRM is about the summation of driving voltage $V_{LED}$ and the forward voltage of wheel diode 16, and the voltage across secondary winding SEC is in proportion to that across primary winding PRM. Accordingly, in case that the voltage at node VOP exceeds a certain limit when the transforming de-energizes, it implies driving voltage $V_{LED}$ is somehow over high, and, responsively, power controller 17 could continuously turn off power switch 18 to stop power conversion of power converter 10, achieving OVP.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
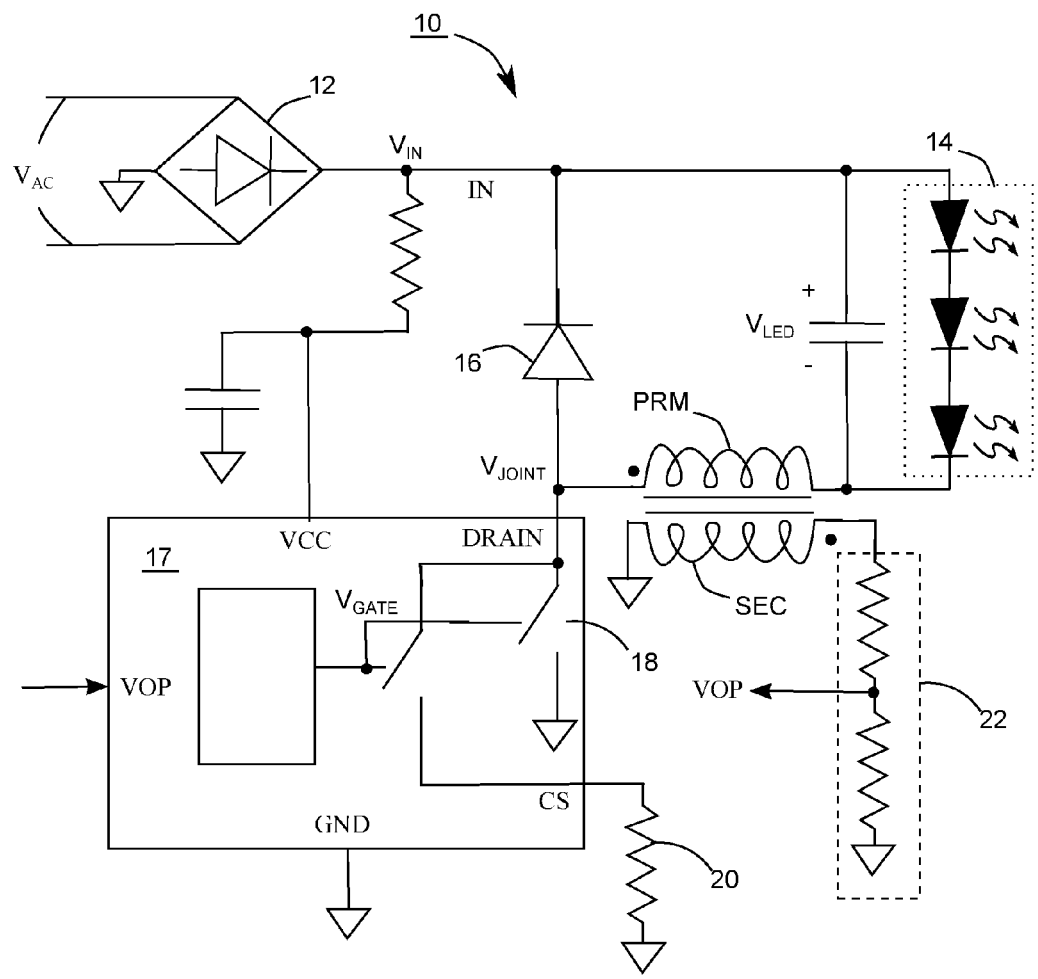
FIG. 1 demonstrates a conventional power converter.

Even power converter 10 in FIG. 1 achieves OVP, it is a costly and bulky solution because of the necessity of the transformer composed of at least primary winding PRM and secondary winding SEC. A transformer, which has more than one windings coupled to each other, normally costs and occupies more than an inductor with only one winding does.

Figure 2:
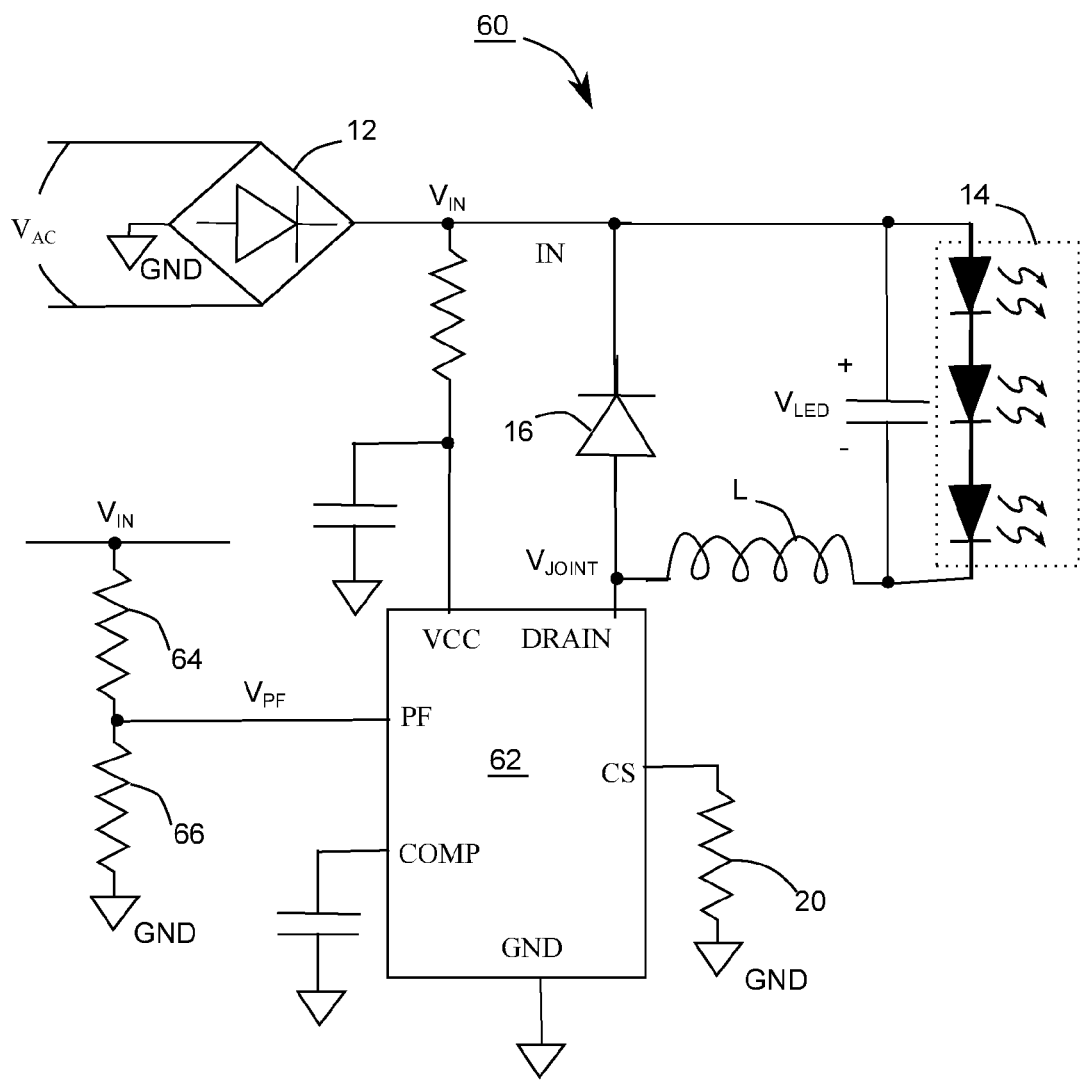
FIG. 2 demonstrates a power converter according to embodiments of the invention.

FIG. 2 demonstrates power converter 60 according to embodiments of the invention, which uses an inductor L to replace the transformer in FIG. 1. Power converter 60 could achieve OVP without a costly and bulky transformer. This does not mean a power converter according to the invention must not have a transformer. Some embodiments of the invention might use one winding of a transformer to be an inductor.

Resistors 64 and 66 for voltage dividing are connected in series between DC input voltage $V_{IN}$ and a ground line GND, where the joint therebetween provides a detection voltage $V_{PF}$ which is therefore a scaled version of DC input voltage $V_{IN}$.

In the embodiment of FIG. 2, power controller 62, which could be in form of an integrated circuit, operates power converter 60 substantially in boundary mode. One operation mode is called discontinuous conduction mode (DCM), referring to that an inductor in a power converter is operated to empty completely the energy stored therein every time when a new switching cycle starts. Another operation mode is continuous conduction mode (CCM), referring to that a power converter is operated to start a new switching cycle while the inductor has not emptied the energy stored. Boundary mode operates a power converter in a way between DCM and CCM, generally referring to that a new switching cycle starts right after the inductor just empties the energy stored.

Inductor L starts to increase its stored energy when the power switch in power controller 62 is turned on, and the voltage $V_L$ and the current $I_L$ of inductor L shall follow the relationship presented as the following equation (I).

$$V_L * T_{ON} = L_L * I_L,$$

$$(V_{IN} - V_{LED}) * T_{ON} = L_L * I_{CS\text{-}PEAK} \qquad (I),$$

where $V_L$ and $I_L$ denote the voltage drop across inductor L and the current through inductor L; $L_L$ the inductance of inductor L; $T_{ON}$ the duration or the ON time when the power switch in power controller 62 is turned on; and $I_{CS\text{-}PEAK}$ the peak current flowing through current-sense resistor 20.

It can be derived from equation (I) that $I_{CS\text{-}PEAK}$ is about 0 when DC input voltage $V_{IN}$ is the same with driving voltage $V_{LED}$, and inductor L cannot be energized. Bridge rectifier 12 causes DC input voltage $V_{IN}$ to follow the absolute value of AC mains voltage $V_{AC}$ if DC input voltage $V_{IN}$ is about less than that absolute value. That absolute value has no influence to DC input voltage $V_{IN}$ nevertheless if DC input voltage $V_{IN}$ exceeds that absolute value. Accordingly, when that absolute value is less than driving voltage $V_{LED}$, DC input voltage $V_{IN}$ will have the same voltage as that of driving voltage $V_{LED}$ because inductor L stops energizing at the same condition. When that absolute value exceeds driving voltage $V_{LED}$, DC input voltage $V_{IN}$ is about the same as that absolute value. It can be concluded that the local minimum of DC input voltage $V_{IN}$ should be about the same as driving voltage $V_{LED}$. A local minimum of DC input voltage $V_{IN}$ happens in a valley of the waveform of DC input voltage $V_{IN}$.

One embodiment of the invention detects a local minimum of DC input voltage $V_{IN}$ to decide whether to trigger OVP.

Power controller 62 in FIG. 2 determines the occurrence of a local minimum of DC input voltage $V_{IN}$ by detecting current-sense signal $V_{CS}$. For example, DC input voltage $V_{IN}$ seems to be in a valley and have a local minimum if current-sense signal $V_{CS}$ continues to be about 0 (or less than a predetermined value $V_{CS-REF}$) for a predetermined period of time. When DC input voltage $V_{IN}$ is in a valley, it could be used to represent driving voltage $V_{LED}$.

Power controller 62 compares detection voltage $V_{PF}$ with a reference voltage for OVP ($V_{OVP-REF}$). If DC input voltage $V_{IN}$ is having a local minimum and detection voltage $V_{PF}$ exceeds reference voltage $V_{OVP-REF}$ driving voltage $V_{LED}$ is deemed to be over high and, in response, power controller 62 provides an OVP signal $S_{Protection}$ to stop the power conversion of power converter 60.

Figure 3:
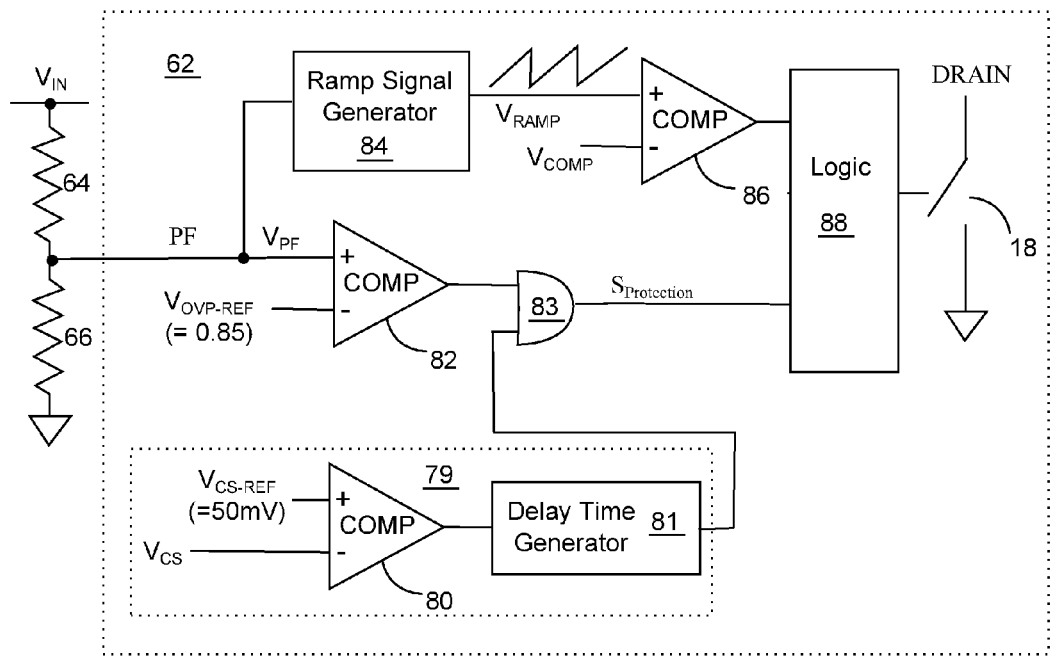
FIG. 3 demonstrates a power controller and some peripheral devices.

FIG. 3 demonstrates power controller 62 and some peripheral devices. Power controller 62 has, but is not limited to have, valley detector 79, OVP comparator 82, ramp-signal generator 84, logics 83 and 88, etc.

Valley detector 79 includes valley comparator 80 and delay time generator 81. Valley comparator 80 compares current-sense signal $V_{CS}$ with a predetermined reference $V_{CS-REF}$ which is 50 mV in one embodiment. If the input of delay time generator 81 indicates that current-sense signal $V_{CS}$ has been less than predetermined reference $V_{CS-REF}$ for a predetermined period of time $T_{OVP-DELAY}$, delay time generator 81 makes its output 1 in logic, meaning the occurrence of a local minimum of DC input voltage $V_{IN}$.

If a local minimum of DC input voltage $V_{IN}$ occurs and OVP comparator 82 deems detection voltage $V_{PF}$ exceeding reference voltage $V_{OVP-REF}$, logic 83 sends out OVP signal $S_{Protection}$ with logic 1 to stop the power conversion of power converter 60, thereby driving voltage $V_{LED}$ being prevented from going higher.

Ramp-signal generator 84 generates ramp signal $V_{RAMP}$, whose slope is determined by a peak value of detection voltage $V_{PF}$. For example, the peak value of detection voltage $V_{PF}$ can be sensed or recorded by power controller 62, and it represents a swing magnitude of AC mains voltage $V_{AC}$. In one embodiment, the higher the peak value of detection voltage $V_{PF}$, the higher the slope of ramp signal $V_{RAMP}$. Both ramp signal $V_{RAMP}$ and a compensation signal $V_{COMP}$ are forwarded to two inputs of comparator 86. For instance, ramp signal $V_{RAMP}$ starts to ramp up at the same time when power switch 18 is turned on. Once ramp signal $V_{RAMP}$ exceeds compensation signal $V_{COMP}$, comparator 86 makes logic 86 to turn off power switch 18. Ramp-signal generator 84 and comparator 86 together can determine the ON time $T_{ON}$ of power switch 18 during which it is turned on.

Figure 4:
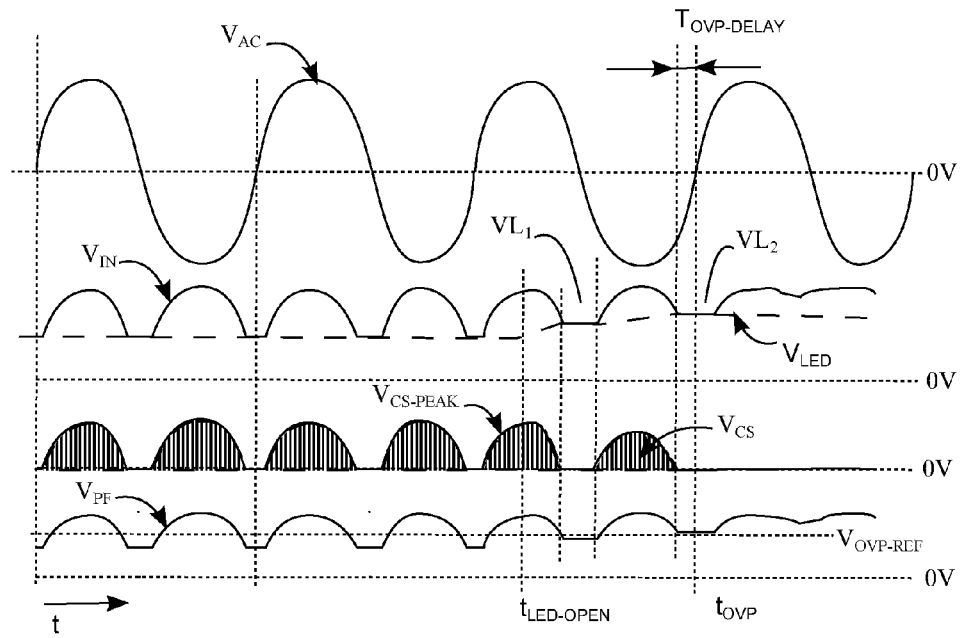
FIG. 4 shows some signal waveforms of signals in FIGS. 2 and 3.

FIG. 4 shows some signal waveforms of signals in FIGS. 2 and 3. AC mains voltage $V_{AC}$ has for example a sinusoidal waveform with a swing magnitude of 110V and a frequency of 60 Hz. Shown in FIG. 4 is also DC input voltage $V_{IN}$, whose local minimums occur in valleys and always even with driving voltage $V_{LED}$. Detection voltage $V_{PF}$ is in proportion to DC input voltage $V_{IN}$.

In FIG. 4, it is supposed that LED module 14 mistakenly becomes open since time $t_{LED-OPEN}$. Accordingly, as an open LED module 14 does not consume electric power and the switching of power switch 18 continues the power conversion, driving voltage $V_{LED}$ ramps up after time $t_{LED-OPEN}$.

A first valley $VL_1$ occurs in the waveform of DC input voltage $V_{IN}$, shown in FIG. 4. In the meantime, OVP is not triggered though because detection voltage $V_{PF}$ has not exceeded reference voltage $V_{OVP-REF}$.

Following the first valley $VL_1$, a second valley $VL_2$ occurs in the waveform of DC input voltage $V_{IN}$. Meanwhile, detection voltage $V_{PF}$ has exceeded reference voltage $V_{OVP-REF}$. At time $t_{OVP}$ which is the moment when current-sense signal $V_{CS}$ has continued to be about 0, or less than reference $V_{CS-REF}$ for a predetermined period of time $T_{OVP-DELAY}$ OVP is triggered. Current-sense signal $V_{CS}$ becomes a constant 0V after time $t_{OVP}$ because power switch 18 is constantly turned off.

Different from FIG. 1, which needs a bulky and costly transformer, FIG. 2 shows power converter 60, which needs only an inductor and is capable of achieving OVP. Power converter 60 could render a product with more market competitiveness in view of its compact size and low cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for over-voltage protection, suitable for a power converter with a rectifier for rectifying an alternative-current voltage to provide a direct-current input voltage, the control method comprising:
   determining whether the direct-current input voltage is in a valley where a local minimum of the direct-current input voltage occurs;
   providing a detection voltage representing the direct-current input voltage;
   comparing the detection voltage with a predetermined reference voltage; and
   providing an OVP signal to stop a power conversion of the power converter when the detection voltage exceeds the predetermined reference voltage and the direct-current input voltage is in the valley.

2. The control method as claimed in claim 1, wherein the power converter includes an inductor, a load capable of emitting light, and a power switch, connected in series, and the step of determining comprises:
   providing a current-sense signal, a representative of a current through the power switch; and
   comparing the current-sense signal with a predetermined value; and
   after the current-sense signal is less than the predetermined value, determining that the direct-current input voltage is in the valley.

3. The control method as claimed in claim 2, comprising:
   after the current-sense signal continues to be less than the predetermined value for a predetermined period of time, determining that the direct-current input voltage is in the valley.

4. The control method as claimed in claim 1, wherein the power converter includes an inductor, a load capable of emitting light, and a power switch, connected in series, the power converter further includes a wheel diode with two terminals coupled to the direct-current input voltage and the power switch respectively.

5. The control method as claimed in claim 1, further comprising:
providing a ramp signal with a slope;
sensing and recording a peak value of the detection voltage; and
determining the slope in accordance with the peak value.

6. The control method as claimed in claim 5, further comprising:
determining an ON time of a power switch based on the ramp signal and a compensation signal.

7. A power controller suitable for a power converter, which comprises a rectifier for rectifying an alternative-current voltage to provide a direct-current input voltage, the power controller comprising:
a valley detector for determining whether the direct-current input voltage is in a valley;
an over-voltage comparator, for comparing a detection voltage with a predetermined reference voltage, wherein the detection voltage is capable of representing the direct-current input voltage; and
a logic coupled to the over-voltage comparator and the valley detector, for providing an OVP signal to stop a power conversion of the power converter when the detection voltage exceeds the predetermined reference voltage and the direct-current input voltage is in the valley.

8. The power controller as claimed in claim 7, wherein power converter is a buck converter including a power switch and an inductor, and the valley detector comprises:
a valley comparator for comparing a current-sense signal with a predetermined value;
wherein the current-sense signal is a representative of a current through the power switch.

9. The power controller as claimed in claim 8, wherein the valley detector further comprises:
a delay time generator, coupled to the valley comparator, for providing an output signal indicating that the direct-current input voltage is in a valley after the current-sense signal has been less than the predetermined value for a predetermined period of time.

10. A power converter, comprising:
a rectifier for rectifying an AC mains voltage to provide a direct-current input voltage and a ground line; and
a power controller, comprising:
a valley detector for determining whether the direct-current input voltage is in a valley; and
an over-voltage comparator, for comparing a detection voltage with a predetermined reference voltage, wherein the detection voltage is capable of representing the direct-current input voltage;
wherein the power controller stops a power conversion of the power converter when the detection voltage exceeds the predetermined reference voltage and the direct-current input voltage is in the valley.

11. The power converter as claimed in claim 10, further comprising:
a buck converter with an inductor and a power switch connected in series between the direct-current input voltage and the ground line;
wherein the valley detector comprises a valley comparator for comparing a current-sense signal with a predetermined value, and the current-sense signal is a representative of a current through the power switch.

12. The power converter as claimed in claim 10, wherein the valley detector further comprises a delay time generator coupled to the valley comparator for providing an output signal indicating that the direct-current input voltage is in a valley after the current-sense signal has been less than the predetermined value for a predetermined period of time.

* * * * *